United States Patent [19]

Tanba et al.

[11] 3,790,435
[45]

[54] SYNTHETIC PAPERS AND METHOD OF MAKING

[75] Inventors: Shigeru Tanba; Mitsuo Yoshiyasu; Yoshio Miyabe, all of Ibaraki, Japan

[73] Assignee: Mitsubishi Petrochemical Company Limited, Tokyo-to, Japan

[22] Filed: June 7, 1972

[21] Appl. No.: 260,526

Related U.S. Application Data

[63] Continuation-in-part of Ser. No. 29,176, April 16, 1970, abandoned.

[30] Foreign Application Priority Data

Apr. 25, 1969 Japan.............................. 44-31473

[52] U.S. Cl.................. 161/160, 156/229, 156/244, 161/162, 161/164, 161/402
[51] Int. Cl....... B32b 3/26, B32b 5/18, B32b 27/08
[58] Field of Search .......... 161/160, 162, 164, 402; 156/229, 244

[56] References Cited
UNITED STATES PATENTS

| | | | |
|---|---|---|---|
| 2,909,443 | 10/1959 | Wolinski | 161/252 |
| 3,154,461 | 10/1964 | Johnson | 161/402 |
| 3,218,224 | 11/1965 | Osborn | 161/247 |
| 3,380,868 | 4/1968 | Moser | 156/229 |
| 3,481,804 | 12/1969 | Snyder | 161/252 |
| 3,503,842 | 3/1970 | Kahn | 161/162 |

*Primary Examiner*—William J. Van Balen
*Attorney, Agent, or Firm*—Robert E. Burns et al.

[57] ABSTRACT

Synthetic papers, endowed with good foldability as well as good paperiness, of a non-laminated structure of one thermoplastic resin film or a laminated structure of at least two thermoplastic resin films. Each of the films is stretched or molecularly oriented, and one or more of the films contain a fine inorganic filler so as to provide paperiness of the film. According to the invention, some of the films contain a certain amount of polystyrene as a foldability improving agent.

19 Claims, 3 Drawing Figures

SYNTHETIC PAPERS AND METHOD OF MAKING

GROSS REFERENCE TO RELATED APPLICATIONS

This application is a continuation-in-part application of our copending application Ser. No. 29,176 filed on Apr. 16, 1970, now abandoned.

BACKGROUND OF THE INVENTION

This invention relates generally to synthetic papers which are improved in their foldability.

Synthetic papers each comprising a stretched or molecularly oriented film have been developed, and some have or are about to be put to practical use. Some of these synthetic papers are satisfactory in the properties which are to be inherent in or essential to "natural" or cellulosic papers such as writability and printability.

Some of these synthetic papers, especially those based on a thermoplastic resin free of a styrene or a polystyrene content, however, are not completely satisfactory in properties which are to be somewhat secondary for paper materials, such as foldability. When a sheet of such a synthetic paper is folded, the fold is not preserved, and the sheet folded tends to recover from the folded state. Such synthetic papers as have poor foldability are not acceptable in applications where preservation of folds is required.

Synthetic papers each comprising a stretched polyolefin film are believed to constitute one class of the most successful synthetic papers, but unfortunately, they often have poor foldability.

SUMMARY OF THE INVENTION

It is an object of the present invention to provide synthetic papers of the class having a stretched or molecularly oriented film of a thermoplastic resin.

It is another object of the invention to provide synthetic papers which are improved in their foldability.

It is a further object of the invention to provide synthetic papers which have good foldability as well as good writability and good printability.

According to the present invention in one aspect thereof, briefly summarized, there is provided a synthetic paper which comprises a writable film which is stretched and is made of a thermoplastic resin having a polystyrene content of 5 to 50 percent by weight of the resin and a fine inorganic filler and having microvoids therein.

According to the present invention in another aspect thereof, briefly summarized, there is provided a synthetic paper of laminated structure which comprises a backing film which is stretched and is made of a thermoplastic resin and a writable film caused to adhere to at least one surface of said backing film, which writable film is stretched and is made of a thermoplastic resin having a fine inorganic filler and microvoids therein, said thermoplastic resins being such that the resin for at least the backing film has a polystyrene content of 5 to 50 percent by weight of the resin and the remaining resin has substantially no polystyrene content.

The synthetic papers according to the present invention are characterized in that they have a writable film which is at least uniaxially, preferably biaxially stretched, or backed by a biaxially stretched backing film, and has a fine inorganic filler and microvoids therein. Because of this characteristic, the instant synthetic papers have excellent stiffness and tensile strength as are required for paper materials and uniform thickness as well as good writability and printability. The good writability and printability are considered to be the result partially of the presence of microvoids in the films produced by stretching of the filler-containing film. The microvoids are distributed uniformly throughout the writable film and, those near the surface of the writable film are open to the surface of the writable film and define therein a cellular, fibrous structure. Such microvoids are developed in the resin of the writable film by stretching the film of the resin containing a fine filler.

A further feature characteristic of the instant synthetic papers is that they have a "foldability improving agent," namely a polystyrene in a specific content. The poor foldability of, for example, stretched-polyolefin-film-based synthetic papers is improved by introducing the agent to the polyolefin so as to produce a homogeneous blend.

We do not desire to be bound by any theory, but it is supposed that, in the homogeneous blend of, for example, polypropylene and polystyrene, the polystyrene and polypropylene form a certain inter-molecular structure, and that, when a film made of the blend is folded, the structure undergoes micro-and macro-destructions, and some inter-molecular slip occurs thereby to reduce the recovery of the structure with the resulting preservation of the fold of the film. The preservation of the fold of the film can also be attributed to the result of recovery-reducing effect of benzene rings of the polystyrene owing to steric hindrance.

DETAILED DESCRIPTION

Figure 1:
FIG. 1 is an enlarged sectional view showing an example of the synthetic paper according to this invention.
Figure 2:
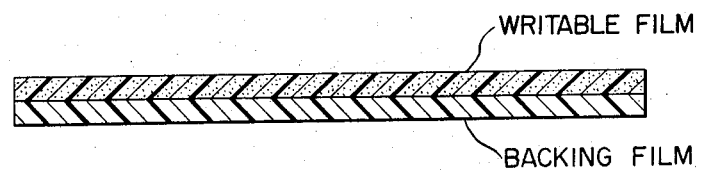
FIG. 2 is an enlarged sectional view showing another example of the synthetic paper according to this invention.
Figure 3:
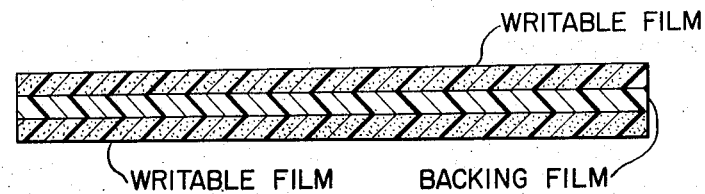
FIG. 3 is an enlarged sectional view showing a further example of the synthetic paper according to this invention.

The synthetic papers according to the present invention may be classified into the following two classes with respect to their structure:

CLASS I

A non-laminated structure solely of a writable or papery (or paper-like) film,

CLASS II

A laminated structure of a writable film adhering to at least one surface of a backing film.

With respect to the materials used, every film in each case is made of a thermoplastic resin, and the resin for the writable film necessarily has a fine inorganic filler. In the case of CLASS II, the resins other than polystyrene or base resins for the writable film and for the backing film can be the same or different.

We have found that the content of the filler in the resin for the writable film is preferably 2 to 15 percent by volume of the resin in the case of class I, and 2 to 30 percent by volume in the case of class II. The resin for the backing film may contain a filler of a content of 0 to 15 percent by volume of the resin. The contents of a filler are defined in this invention in terms of volumetric basis, where the volumes of the filler and the resin in question are each calculated by its weight used and true density.

These contents are preferable in view of the fact that the stretched films containing a filler within these ranges have such excellent paperiness inclusive of good writability and good printability that they are suitable as sheet stocks for offset printing and photogravure printing, and that films to be stretched have sufficient formability such as drawability and stretchability, heat-sealability, and surface smoothness.

In the case of Class II, the backing film, in addition to the writable film, may preferably contain a filler in order to enhance the opacity and whiteness thereof and to make the surface thereof more adhesive. Excessive content of the filler, for example, more than the preferred content stated hereinbefore, however, is not desirable because it gives rise to poor formability of the resin into biaxally stretched film.

Further, according to the present invention, a polystyrene is blended in the resin for the writable film in the case of Class I, and in the resin for the backing film or resins for both the backing and writing films in the case of Class II. The polystyrene content in the resin or each resin is 5 to 50 percent, preferably 10 to 50 percent by weight of the resin.

We have found further that the polystyrene content within the range specified above is necessary to obtain printability and stiffness as well as good foldability of the synthetic papers of the present invention. Good foldability cannot be obtained with a polystyrene content less than 5 percent. On the other hand, it is necessary that the content be less than 50 percent in order to retain the formability into biaxially stretched films and to prevent substantial lowering of the tear strength, impact strength and tensile strength of the synthetic papers produced therefrom.

The base resin used singly or in admixture with a polystyrene so as to produce the thermoplastic resin is such that it is "substantially" free of polystyrene content. The base resin, accordingly, can be a blend containing a polystyrene of less than 5 percent by weight of the blend. The base resin should be capable of being stretched or molecularly oriented.

Typical base resins which may be used singly or in admixture include: polyolefin resins such as homo- or co-polymers of ethylene, propylene, butene-1, and mixtures thereof, polyamide resins, polyester resins such as polyethylene terephthalates, pilyvinyl resins such as homo-and co-polymers of vinyl chloride, polyvinylidene resins such as homo- and co-polymers of vinylidene chloride, and the like.

The most typical base resins are polyolefin resins, such as low to high density polyethylenes, isotactic polypropylenes, and resinous copolymers of ethylene with propylene. The isotactic polypropylenes preferably have a melt index (M.I.) of 0.3 to 10 for the biaxially stretched film in order to assure good formability, stiffness, and strength in the film.

Typical examples of the fine inorganic fillers which may be used singly or in admixture include: clay, talc, asbestos, gypsum, barium sulfate, calcium carbonate, titanium oxide, zinc oxide, magnesium oxide, diatomaceous earth, and silicon oxide. It is necessary that the filler to be used be sufficiently fine, for example, of grain size of the order of approximately 0.5 to 30 microns.

The foldability improving agents or polystyrenes are homo- and co-polymers of styrene or nuclear-and/or side chain-substituted derivatives of styrene, the co-polymers being preferably rich in styrene. The substituents in the substituted derivatives of styrene are, for example, halogens such as chlorine, and alkyls containing one to 12 carbon atoms such as lower alkyls. Typical examples of the substituted derivatives of styrene include vinyl toluenes, α-methyl styrene, and p-chlorostyrene, and the like. The polystyrenes preferably have a melt index of 5 to 25.

The thermoplastic resins may contain any conventional additive such as a stabilizer against oxidation, a plasticizer, a coloring agent, a blowing agent, and the like.

The synthetic papers according to the present invention are produced by a process which comprises the steps of forming a film and stretching the film.

In the case of Class I, a mixture of a thermoplastic resin consisting essentially of 5 to 50 percent by weight of polystyrene and 95 to 50 percent by weight of, for example, isotactic polypropylene of a melt index (MI) of 0.3 to 10 and a fine inorganic filler of, for example, 2 to 15 percent by volume of the resins is subjected to a film-forming procedure thereby to produce a non-stretched film. Any suitable film-forming procedure inclusive of calendering, extrusion and inflation can be followed.

The non-stretched film thus produced is then subjected to stretching procedure thereby to produce a uniaxially or biaxially stretched or molecularly oriented film. Any suitable stretching procedure inclusive of tentering and stretching during inflation can be resorted to.

The stretching ratio is preferably 2 to 7 in the case of a uniaxially stretched film, and (2 to 7) × (2 to 7) in the case of a biaxially stretched film, the film being a writable film or a backing film.

In the case of Class II, a writable film is caused to adhere to one surface or both surfaces of a backing film. The adhesion can be achieved by any suitable lamination procedure inclusive of calendering and melt extrusion lamination.

In the case of Class II, it is preferable that the writable film be uniaxially stretched and the backing film be biaxially stretched. Accordingly, a preferable procedure to produce such laminated films is to laminate the writable film by melt extrusion lamination from the melt of the material stock for the writable film onto at least one surface of backing film which has been stretched uniaxially in a longitudinal direction and to stretch the laminate thus produced in a transverse direction thereby to produce a laminate structure a writable film on which is uniaxially stretched and a backing film of which is biaxially stretched.

In the case of Class II, the foldability improving agent may be incorporated into a backing film or into both a backing film and a writable film.

EXAMPLE 1

A mixture of 80 parts of polypropylene of a melt index (MI) of 0.8 as a base resin and 20 parts of polystyrene of an MI of 8.5 as a foldability improving agent was blended for 10 minutes (min.) by means of a V- blender, kneaded in an extruder at 250°C, and extruded through a die orifice of the extruder. The extrudate was cooled and pelleted. The pellets thus produced were kneaded in an extruder at 250°C, extruded through a T-die, and cooled to lower than 40°C thereby to produce a non-stretched film.

The non-stretched film thus produced was stretched and oriented by five times in a longitudinal direction to produce a uniaxially stretched film to be used as a backing film.

A composition consisting of 60 parts of polypropylene (MI = 8), 40 parts of polystyrene (MI = 19), 30 parts of kaolin clay, and 10 parts of titanium white was extrusion-laminated onto both surfaces of the uniaxially stretched film. The laminated film thus produced was then stretched under heat by six times in the transverse direction to obtain a three-ply laminated film biaxially stretched with respect to the backing or inner film and uniaxilially stretched with respect to the writable or outer films and cooled while its oriented state was being maintained, listings thereof being cut out thereby to produce a synthetic paper which was wound into a roll.

The synthetic paper thus produced had greatly improved foldability in comparison with laminated oriented polypropylene film containing an inorganic filler but no polystyrene.

EXAMPLE 2

A mixture of 100 to 40 parts of polypropylene (MI = 1.2), 0 to 60 parts of polystyrene (MI = 7.0), and 5 phr (parts per hundred of resin) of kaolin clay was blended by means of a mixer, kneaded in an extruder at 250°C, extruded through a strand-die, and cooled. The extrudate was pelleted.

The pellets were kneaded in an extruder at 250°C, extruded through a T-die, and cooled to 30°C thereby to produce a non-stretched film.

The non-stretched film thus produced was stretched by two times in longitudinal direction, and then four times in transverse direction under heat. The biaxially stretched film was cooled while its oriented state was being maintained and, after listings thereof were cutout, was wound into a roll.

The synthetic paper thus produced was greatly improved in foldability in comparison with biaxially stretched polypropylene film containing an inorganic filler but no polystyrene.

Physical properties of the synthetic papers obtained in Examples 1, 2, and Modified 2 were determined, and the results obtained are set forth in the following tables.

Table I

| Resin used | Thickness (μ) | Foldability (degree) | Tensile strength (kg/cm²) | Heat-sealability | Clark Stiffness | Touch |
|---|---|---|---|---|---|---|
| polypropylene | 90 | 110 | 950 | good | 20 | excellent |
| polypropylene polystyrene | 90 | 45 | 870 | fair | 20 | good |

Table II

Example 2 (stretching: 2×4)

| Resin used | | Foldability (degree) | Tensile Strength (kg/cm²) | Impact Strength (kg/cm²) | Moldability of the Resin |
|---|---|---|---|---|---|
| Polystyrene (parts by weight) | Polypropylene (parts by weight) | | | | |
| 0 | 100 | 108 | 1550 | 610 | good |
| 5 | 95 | 85 | 1500 | 670 | good |
| 10 | 90 | 70 | 1430 | 450 | good |
| 20 | 80 | 55 | 1290 | 450 | good |
| 30 | 70 | 40 | 1125 | 380 | good |
| 50 | 50 | 20 | 930 | 270 | fair |
| 60 | 40 | 20 | 850 | 200 | no good |

Table III

Modified Example 2 (Stretching: 5.5×7.5)

| Resin used | | Foldability (degree) | Tensile Strength (kg/cm²) | Impact Strength (kg/cm²) | Moldability of the Resin |
|---|---|---|---|---|---|
| Polystyrene (parts by weight) | Polypropylene (parts by weight) | | | | |
| 0 | 100 | 120 | 1600 | 552 | good |
| 5 | 95 | 95 | 1520 | 550 | good |
| 10 | 90 | 88 | 1440 | 520 | good |
| 20 | 80 | 65 | 1440 | 430 | good |
| 30 | 70 | 50 | 1450 | 410 | good |
| 50 | 50 | 40 | 1280 | 380 | fair |
| 60 | 40 | — | — | — | no good |

The principal physical properties of the synthetic papers obtained were determined according to the following procedures.

Foldability

A sample of the synthetic paper to be tested was folded by means of a metal roller exerting a linear pressure of 1 kg/cm, and the angle of recovery after 10 min. was determined.

Tensile Strength

The procedure according to the Japanese Industrial Standards, Designation JIS Z 1720, equivalent to ASTM D 882.

Impact Strength

A procedure in which a hammer is used with hammer angle of 90°, and the size of the impact attachment is 1 inch square.

Clark Stiffness

The procedure according to TAPPI T-451.

Heatsealability

A heatsealed sample is tested by the procedure according to JIS Z 1702.

The synthetic papers according to the present invention can have any thickness possible. The synthetic paers of Class I usually have a thickness of 30 to 70 microns, and those of Class II usually have thickness of 30 to 70 microns for a backing film and 5 to 30 microns for each writable film.

The synthetic papers according to this invention as described above can be applied for various and suitable uses of conventional or cellulosic papers as high grade printing papers, papers for cards, maps, and charts, decoration papers, dull finished or mat papers, typewriting papers, duplicating papers, drafting papers, tracing papers, writting papers, drawings papers, packaging papers, wrapping papers, paper boards, and the like.

What we claim is:

1. A synthetic paper improved in foldability comprising a writing film made of a thermoplastic resin comprising a homogeneous blend of polystyrene with a polymer selected from the group consisting of homopolymers and copolymers of an olefin, vinyl chloride, and vinylidene chloride, and polyesters, having a polystyrene content of 5 to 50 percent by weight of the resin and particles of a fine inorganic filler having a grain size of 0.5 to 30 microns and of 2 to 15 percent by volume of the resin uniformly dispersed therein, said film being in a biaxially oriented state, and having microvoids developed therein by said particles and stretching of the resin containing said fine filler uniformly dispersed therein, and said microvoids including microvoids on the surface of the writing film in communication with the exterior of the writing film.

2. A synthetic paper as claimed in claim 1 in which said film is stretched in a longitudinal direction and in a transverse direction each by at least 2 times.

3. A synthetic paper as claimed in claim 1 in which said polystyrene is present in the film in an amount of 10 to 50 percent by weight of the resin.

4. A synthetic paper as claimed in claim 1 in which said thermoplastic resin is a homogeneous blend of a polyolefin and a polystyrene.

5. A synthetic paper as claimed in claim 4 in which said polyolefin is selected from the group consisting of homopolymers and copolymers of ethylene and propylene.

6. A synthetic as claimed in claim 5 in which said polyolefin is isotactic polypropylene.

7. A synthetic paper as claimed in claim 1 in which said polystyrene is a polymer of styrene.

8. A synthetic paper improved in foldability comprising a laminated structure, which synthetic paper comprises a backing film made of a thermoplastic resin comprising a homogeneous blend of polystyrene with a polymer selected from the group consisting of homopolymers and copolymers of an olefin, vinyl chloride, and vinylidene chloride, and polyesters, biaxially stretched and oriented, and a writing film adhering to at least one surface of said backing film, said writing film being made of a thermoplastic resin comprising a polymer selected from the group consisting of homopolymers and copolymers of olefins uniaxially stretched and oriented and having particles of a fine inorganic filler having a grain size of 0.5 to 30 microns and of 2 to 30 percent by volume of the resin uniformly dispersed therein, and having microvoids developed therein by said particles and stretching of the resin containing said particles of fine filler uniformly dispersed in the resin and including microvoids on the surface of the writing film and in communication with the exterior of the writing film, said thermoplastic resin for the backing film having a polystyrene content of 5 to 50 percent by weight of the resin, and the remaining resin having substantially no polystyrene content.

9. A synthetic paper as claimed in claim 8 in which said writing film is adhered to both surfaces of said backing film.

10. A synthetic paper as claimed in claim 8 in which said writing film is made of a thermoplastic resin comprising a homogeneous blend of polystyrene with a polymer selected from the group consisting of homopolymers and copolymers of an olefin, vinyl chloride, and vinylidene chloride, and polyesters.

11. A synthetic paper as claimed in claim 8 in which said backing film and said writing film are selected in each direction by at least two times.

12. A synthetic paper as claimed in claim 8 in which said backing film has a fine inorganic filler in a content of up to 15 percent by volume of the resin.

13. A synthetic paper as claimed in claim 8 in which said polystyrene is present in at least one of said backing film and said writing film in an amount of 10 to 50 percent of the resin.

14. A synthetic paper as claimed in claim 8 in which said thermoplastic resin for at least said backing film is a homogeneous blend of a polyolefin resin and a polystyrene.

15. A synthetic paper as claimed in claim 14 in which said polyolefin is selected from the group consisting of homopolymers and copolymers of ethylene and propylene.

16. A synthetic paper as claimed in claim 15 in which said polyolefin is isotactic polypropylene.

17. A synthetic paper as claimed in claim 10 in which said polystyrene is a polymer of styrene.

18. A process for producing a synthetic paper which comprises the steps of:

A. preparing a mixture comprising a thermoplastic resin blend of 5 to 50 percent of a polystyrene and 95 to 5 percent of a thermoplastic base resin, the percentages being by weight of the resin blend, and 2 to 15 percent by volume of the resin of a fine inorganic filler;

B. producing a non-stretched film from the mixture; and

C. stretching the film at least uniaxially to produce a stretched film as a synthetic paper.

19. A process for producing a synthetic paper which comprises the steps of:

A. producing a non-stretched film from a mixture comprising a thermoplastic resin blend of 5 to 50 percent of a polystyrene and 95 to 5 of a thermoplastic base resin, the percentages being by weight of the resin blend, and 0 percent to 15 percent by volume of the resin blend of a fine inorganic filler;

B. stretching the film in a longitudinal direction to produce a uniaxially stretched film;

C. laminating a film onto at least one surface of the uniaxially stretched film to produce a partially stretched laminate, the former film being produced from a mixture comprising a thermoplastic resin blend of 0 to 50 percent of a polystyrene and 100 to 50 percent of a thermoplastic base resin, the percentages being by weight of the resin blend and a fine inorganic filler; and D. stretching the laminate then in a transverse direction thereby to produce a totally stretched laminate in which one ply is stretched biaxially and a remaining ply is uniaxially stretched.

* * * * *